US010140086B2

(12) United States Patent
Hong

(10) Patent No.: US 10,140,086 B2
(45) Date of Patent: Nov. 27, 2018

(54) ELECTRONIC DEVICE AND AUDIO OUPUTTING METHOD THEREOF

(71) Applicant: SAMSUNG ELECTRONICS CO., LTD., Suwon-si, Gyeonggi-do (KR)

(72) Inventor: Eun Seok Hong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/290,006

(22) Filed: Oct. 11, 2016

(65) Prior Publication Data

US 2017/0102914 A1   Apr. 13, 2017

(30) Foreign Application Priority Data

Oct. 13, 2015 (KR) ........................ 10-2015-0142922

(51) Int. Cl.
  *G06F 3/16* (2006.01)
  *H04L 12/707* (2013.01)
  *H04W 4/80* (2018.01)

(52) U.S. Cl.
  CPC .............. *G06F 3/165* (2013.01); *H04L 45/22* (2013.01); *H04W 4/80* (2018.02)

(58) Field of Classification Search
  CPC ......... G06F 3/165; H04L 45/22; H04W 4/008
  USPC .......................................................... 381/81
  See application file for complete search history.

(56) References Cited

U.S. PATENT DOCUMENTS

| 7,765,019 | B2 * | 7/2010 | Sinai ...................... G06F 3/162 700/94 |
| 7,877,116 | B2 | 1/2011 | Simmons et al. |
| 8,041,438 | B2 | 10/2011 | Batson et al. |
| 8,473,011 | B2 | 6/2013 | Simmons et al. |
| 8,694,140 | B2 | 4/2014 | Batson et al. |
| 8,694,141 | B2 | 4/2014 | Batson et al. |
| 2007/0124150 | A1 * | 5/2007 | Sinai ...................... G06F 3/162 704/500 |
| 2009/0005891 | A1 | 1/2009 | Batson et al. |
| 2009/0061944 | A1 | 3/2009 | Simmons et al. |
| 2011/0086629 | A1 | 4/2011 | Simmons et al. |
| 2011/0320022 | A1 | 12/2011 | Batson et al. |
| 2012/0005380 | A1 | 1/2012 | Batson et al. |
| 2014/0222178 | A1 | 8/2014 | Batson et al. |

(Continued)

FOREIGN PATENT DOCUMENTS

KR   10-1427717   8/2014

OTHER PUBLICATIONS

Indeevar, 2012-2013, Indeevar-Bluetooth headset, p. 1-p. 2.*

(Continued)

*Primary Examiner* — William A Jerez Lora
(74) *Attorney, Agent, or Firm* — Nixon & Vanderhye P.C.

(57) ABSTRACT

An electronic device includes an audio module, a Bluetooth module, and a processor. If an audio output mode is a mode in which the audio module and the Bluetooth module are activated at the same time and if playback of audio data is requested while the Bluetooth module is connected with an external device, the processor is configured to determine whether the audio data is call data or media data, to send the audio data through a first path if the audio data is the call data, and to send the audio data through a second path if the audio data is the media data.

18 Claims, 9 Drawing Sheets

(56) References Cited

U.S. PATENT DOCUMENTS

2015/0052466 A1* 2/2015 Chun .................. G06F 3/0486
715/769
2016/0121479 A1* 5/2016 Lin .................. B25J 9/0003
700/264

OTHER PUBLICATIONS

SoundAbout, 2014, SoundAbout-Android Apps on Google Play, p. 1-p. 2.*
Indeevar, 2012-2013, Indeevar-Bluettoh headset, p. 1-p. 2.*

* cited by examiner

ELECTRONIC DEVICE AND AUDIO OUPUTTING METHOD THEREOF

CROSS-REFERENCE TO RELATED APPLICATION

This application is based on and claims priority under 35 U.S.C. § 119 to a Korean patent application filed on Oct. 13, 2015 in the Korean Intellectual Property Office and assigned Serial number 10-2015-0142922, the disclosure of which is incorporated by reference herein in its entirety.

TECHNICAL FIELD

The present disclosure relates generally to an audio outputting method of an electronic device that is capable of outputting audio data.

BACKGROUND

With the development of electronic technologies, various types of electronic devices are being developed and supplied. In particular, a smart electronic device, such as a smartphone, a tablet personal computer (PC), a smart TV, or the like has come into wide use.

A technology that operates with the electronic device connected with a peripheral device has been developed for the convenient use of an electronic device. For example, a user may make a call or listen to music through a Bluetooth device wirelessly connected with the electronic device.

In the case where the electronic device is connected with the Bluetooth device, all pieces of audio data that are played or executed by the electronic device may be output through the Bluetooth device after being sent to the Bluetooth device. In the case where a user wants to output audio data from the electronic device with the electronic device connected with the Bluetooth device, there is inconvenience that the user should disconnect the Bluetooth device.

Alternatively, if the playback of other audio data of which the priority is high (e.g., receiving a call at the electronic device while audio data is played) is requested, the playback of the existing audio data may be interrupted.

SUMMARY

Aspects of the present disclosure address at least the above-mentioned problems and/or disadvantages and to provide at least the advantages described below. Accordingly, an aspect of the present disclosure is to provide a method of outputting different kinds of audio data at the same time through an electronic device and a Bluetooth device while the electronic device is connected with the Bluetooth device.

In accordance with an example aspect of the present disclosure, an electronic device includes an audio module including audio circuitry, a Bluetooth module including Bluetooth circuitry, and a processor. If an audio output mode is a mode in which the audio module and the Bluetooth module are activated at the same time and if playback of audio data is requested while the Bluetooth module is connected with an external device, the processor is configured to determine whether the audio data is call data or media data, to send the audio data through a first path if the audio data is the call data, and to send the audio data through a second path if the audio data is the media data.

In accordance with an example aspect of the present disclosure, an audio outputting method of an electronic device includes setting an audio output mode to a mode, in which an audio module comprising audio circuitry and a Bluetooth module comprising Bluetooth circuitry are activated at the same time, connecting the electronic device with an external device through the Bluetooth module, determining whether audio data is call data or media data, if playback of the audio data is requested, sending the audio data through a first path if the audio data is the call data, and sending the audio data through a second path if the audio data is the media data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of example embodiments of the present disclosure will be more apparent from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
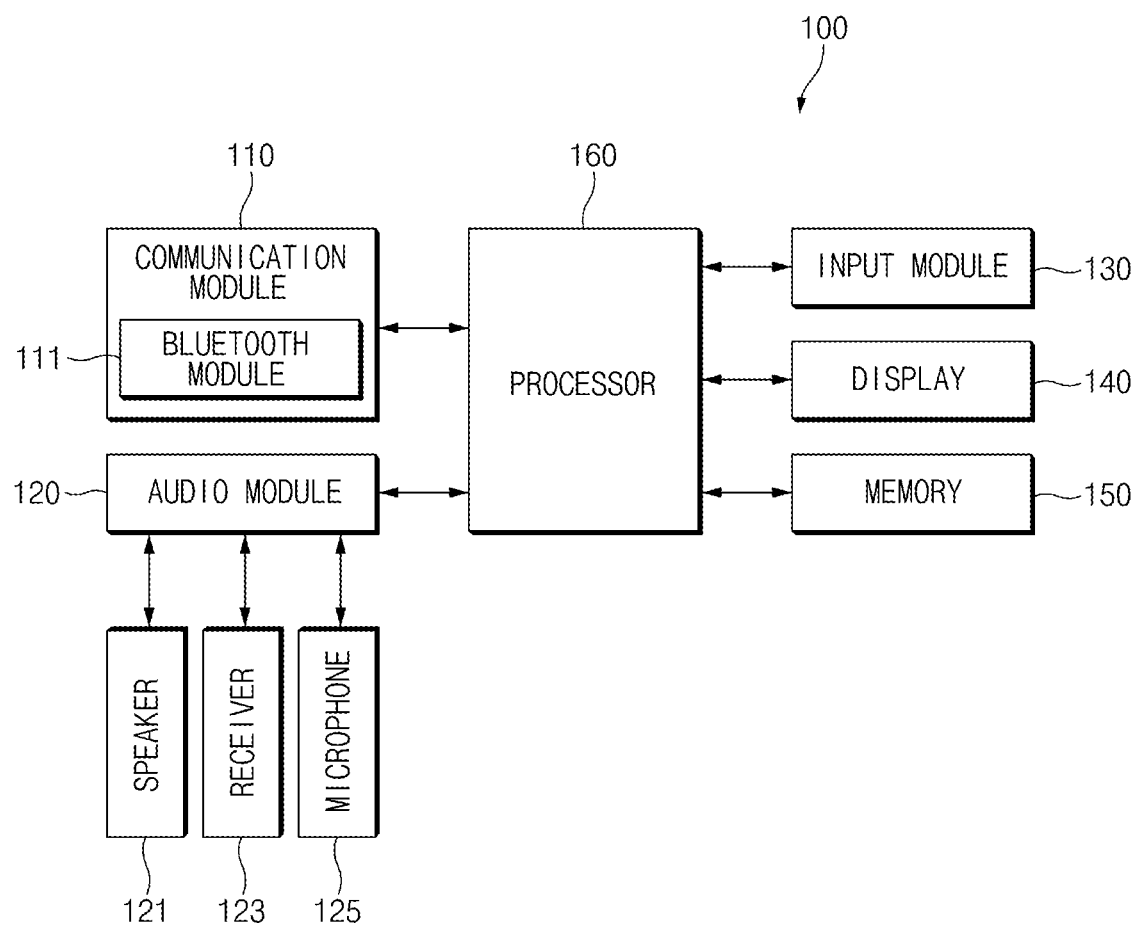
FIG. 1 is a block diagram illustrating an example configuration of an electronic device, according to various example embodiments.

FIG. 1 is a block diagram illustrating an example configuration of an electronic device, according to various example embodiments.

Referring to FIG. 1, an electronic device 100 may include a communication module (e.g., including communication circuitry) 110, an audio module (e.g., including audio circuitry) 120, a speaker 121, a receiver 123, a microphone 125, an input module (e.g., including input circuitry) 130, a display 140, a memory 150, and a processor 160.

According to an example embodiment, the communication module 110 may use various communication circuitry to communicate with an external device. According to an example embodiment, the communication module 110 may include various communication circuitry, such as, for example, and without limitation, a Bluetooth module 111. According to an example embodiment, if the Bluetooth module 111 is activated by the processor 160, the Bluetooth module 111 may be connected with an external device and may perform Bluetooth communication. For example, the Bluetooth module 111 may perform Bluetooth pairing to connect with the external device. The external device may be an audio output device, which is capable of performing Bluetooth communication, for example, a portable Bluetooth speaker, a Bluetooth speaker for vehicles, a Bluetooth headset, a Bluetooth earphone, or the like.

According to an example embodiment, the communication module 110 may include various communication circuitry, such as, for example, and without limitation, a radio frequency (RF) module, a cellular module, a wireless-fidelity (Wi-Fi) module, a global navigation satellite system (GNSS) module, or a near field communication (NFC) module (not shown). The electronic device 100 may be connected to, for example, a network (e.g., an Internet network or a mobile communication network) through at least circuitry of one of the modules to communicate with the external device. Also, the electronic device 100 may be directly connected with, for example, an external device to communicate with the external device.

The audio module 120 may include various circuitry to process audio data. For example, the audio module 120 may encode or decode the audio data input or output through the speaker 121, the receiver 123, the microphone 125, or the like. According to an embodiment, the audio module 120 may output audio data, which is received from the processor 160, through the speaker 121 or the receiver 123. According to an example embodiment, the audio module 120 may use various audio processing circuitry to send the audio data, which is received from the microphone 125, to the processor 160.

According to an example embodiment, the speaker 121 and the receiver 123 may convert the audio data, which is received from the audio circuitry of the audio module 120, into sound and may output the sound. According to an example embodiment, the speaker 121 may output sound (e.g., music) which is greater than that of the receiver 123, and the receiver 123 may output sound (e.g., a voice call) which is smaller than that of the speaker 121. According to an embodiment, the audio module 120 may output media data through the speaker 121 and may output call data through the speaker 121 or the receiver 123.

According to an embodiment, the microphone 125 may convert sound into audio data. For example, the microphone 125 may convert the voice of a user into audio data during a voice call. According to an embodiment, the microphone 125 may send the converted audio data to the audio module 120.

According to an embodiment, the audio data may include call data and media data. The call data may refer, for example, to voice data that is sent and received to and from an external device during a voice call or video call to the external device. The media data may refer, for example, to all kinds of pieces of audio data except the call data.

The input module 130 may include various input circuitry configured to receive (or sense) a user input. According to an embodiment, the input module 130 may include various input circuitry, such as, for example, and without limitation, a touch sensor panel that senses the touch manipulation of a user or a pen sensor panel (e.g., a digitizer) that senses the pen manipulation of a user. According to an embodiment, the input module 130 may include various input circuitry, such as, for example, and without limitation, a motion recognition sensor for recognizing the motion of a user or a voice recognition sensor for recognizing the voice of a user.

According to an embodiment, the input circuitry of the input module 130 may receive a user input for setting an audio output mode (or a Bluetooth mode). According to an embodiment, the input circuitry of the input module 130 may receive a user input for setting the transmission path of audio data.

The display 140 may display a user interface. According to an embodiment, the display 140 may display a user interface for setting an audio output mode (or a Bluetooth mode). The user interface may include, for example, an icon indicating a current audio output mode of the electronic device 100. A user may set, for example, the audio output mode by using the user interface. According to an embodiment, the display 140 may display a user interface for setting the transmission path of audio data. A user may set, for example, the audio output mode by using the user interface.

According to an embodiment, the input module 130 and the display 140, for example, may be implemented with a touch screen that is capable of displaying and sensing a touch manipulation at the same time. In the touch screen, an input panel may be disposed on the display panel.

According to an embodiment, the memory 150 may store media data. The media data may include a variety of data having audio data, for example, music, a movie, a video, a bell sound, a game, or the like. If the playback of the media data is requested, the media data stored in the memory 150 may be sent to the processor 160.

The processor 160 may control overall operations of the electronic device 100. According to an embodiment, the processor 160 may include various processing circuitry, including at least one processor. According to an embodiment, the processor 160 may output audio data according to various embodiments of the present disclosure by controlling the communication module 110, the audio module 120, the input module 130, the display 140, and the memory 150, respectively. According to an embodiment, the processor 160 (e.g., an application processor) may be implemented with a system on chip (SoC) including a central processing unit (CPU), a graphic processing unit (GPU), a memory, and the like.

According to an embodiment, the processor 160 may set an audio output mode based on a user input. According to an embodiment, the audio output mode of the electronic device 100 may include a first mode in which the audio module 120 is activated, a second mode in which the Bluetooth module 111 is activated, and a third mode in which the audio module 120 and the Bluetooth module 111 are activated at the same time. The first mode may be, for example, a mode in which audio data that is played by the electronic device 100 (or that the electronic device 100 is requested to play) is output through the electronic device 100 (e.g., the speaker 121 or the receiver 123). The second mode may be, for example, a mode in which the audio data that is played by the electronic device 100 (or that the electronic device 100 is requested to play) is output through an external device with the Bluetooth module 111 connected with the external device. The third mode may be, for example, a mode in which the audio data that is played by the electronic device 100 (or that the electronic device 100 is requested to play) is output through the electronic device 100 or an external device based on the kind of audio data. According to the third mode, if different kinds of audio data are played (or if the playback of different kinds of audio data is requested) at the same time, the different kinds of audio data may be output from the electronic device 100 and an external device at the same time. According to an embodiment, the processor 160 may set an audio output mode as one of the first to third modes based on a user input.

FIGS. 2A, 2B, 2C and 2D are diagrams illustrating an example user interface according to various example embodiments of the present disclosure.

Referring to FIGS. 2A to 2D, the processor 160 may display a user interface for setting an audio output mode (or a Bluetooth mode), on the display 140. For example, the processor 160 may display the user interface illustrated in FIG. 2 if the touch manipulation of a user that moves toward the inside of the display 140 from the outside of the display 140 is input. According to an embodiment, the user interface may include icons 11, 13, and 15 indicating a current audio output mode. According to an embodiment, a user may change the audio output mode using the icon 11, 13, or 15.

Figure 2A:
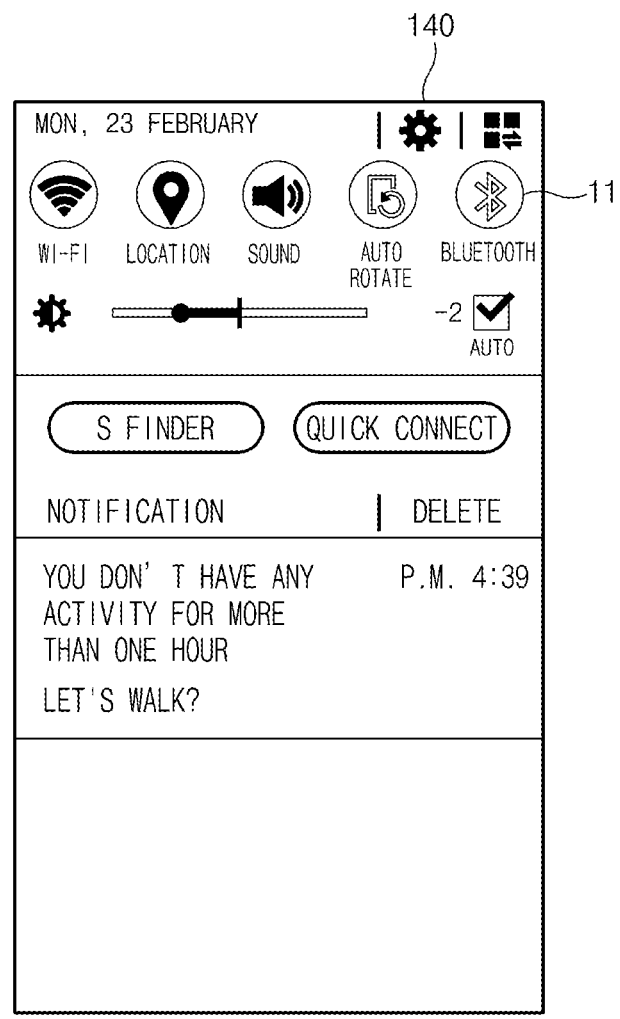
FIGS. 2A, 2B, 2C and 2D are diagrams illustrating an example user interface according to various example embodiments of the present disclosure.

Referring to FIG. 2A, if the audio output mode is set as a first mode, the processor 160 may display the icon 11 corresponding to the first mode on the display 140. If the icon 11 is selected by a user, the processor 160 may set the audio output mode as a second mode.

Figure 2B:
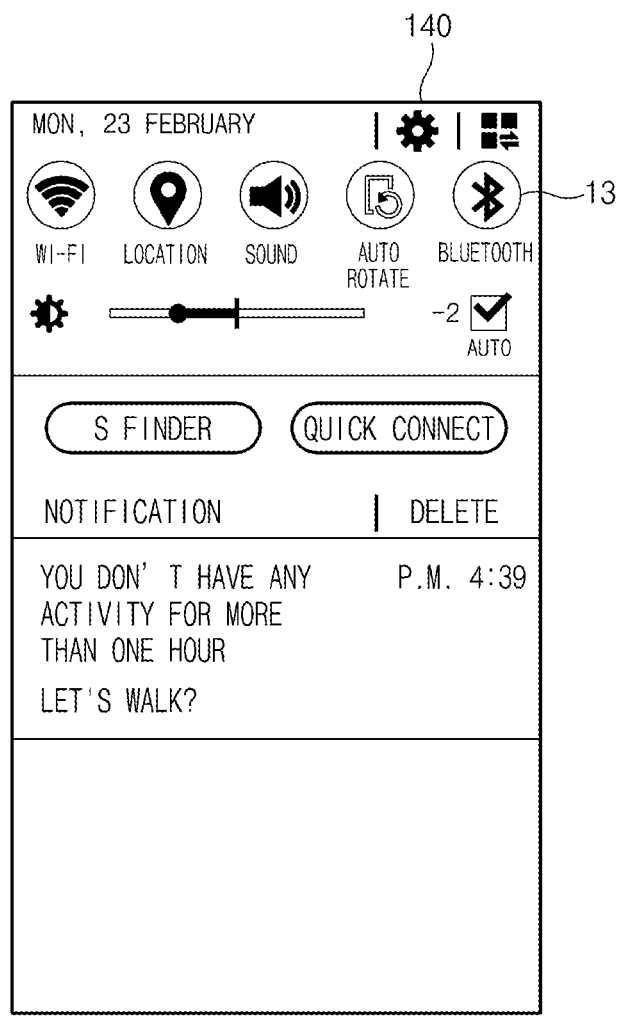

Referring to FIG. 2B, if the audio output mode is set as the second mode, the processor 160 may display the icon 13 corresponding to the second mode on the display 140. If the icon 13 is selected by a user, the processor 160 may set the audio output mode as a third mode.

Figure 2C:
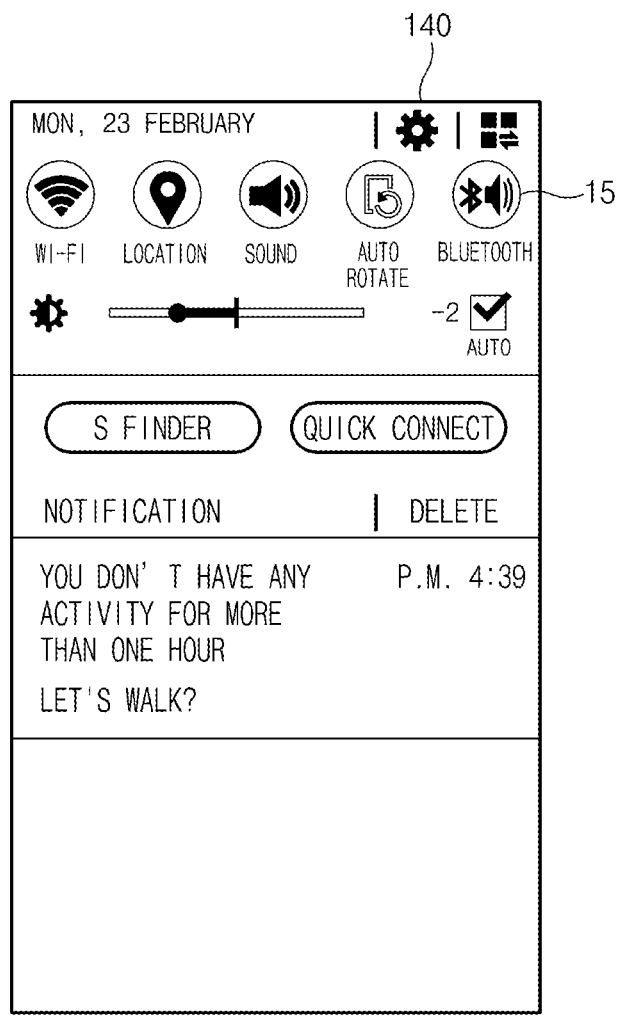

Referring to FIG. 2C, if the audio output mode is set as the third mode, the processor 160 may display the icon 15 corresponding to the third mode on the display 140. If the icon 15 is selected by a user, the processor 160 may set the audio output mode as the first mode.

Figure 2D:
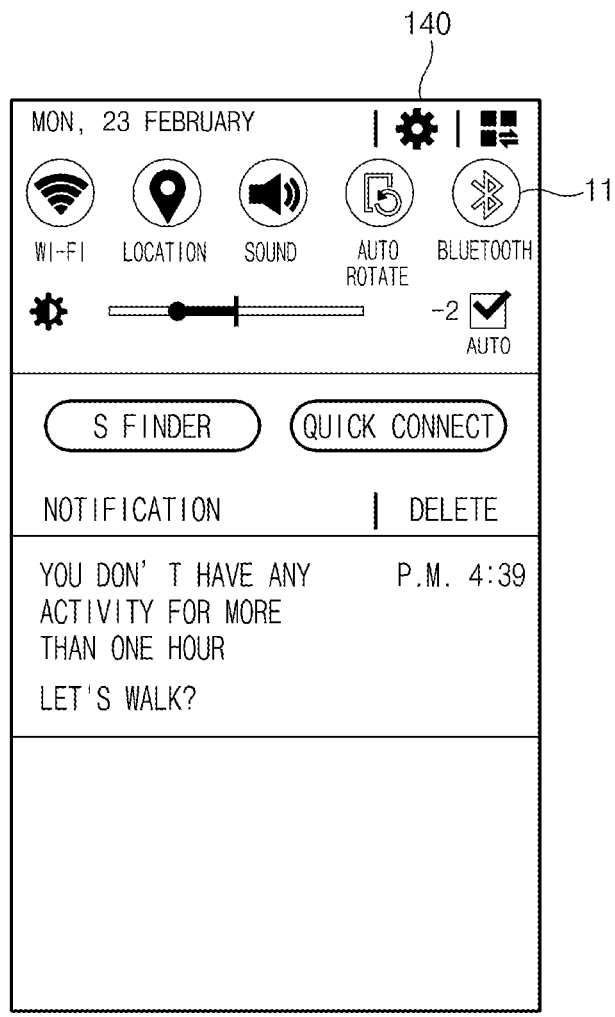

Referring to FIG. 2D, if the audio output mode is set as the first mode, the processor 160 may display the icon 11 corresponding to the first mode on the display 140. According to an embodiment, an icon indicating the audio output mode may be changed in the order of the first mode, the second mode, and the third mode based on the input of a user.

Figure 3A:
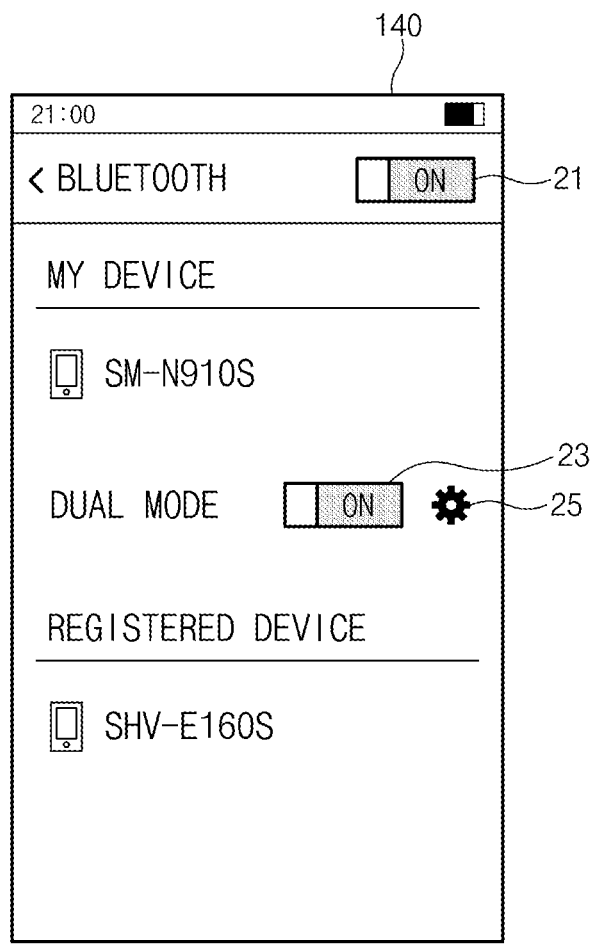
FIGS. 3A, 3B and 3C are diagrams illustrating an example user interface, according to various example embodiments of the present disclosure.
Figure 3B:
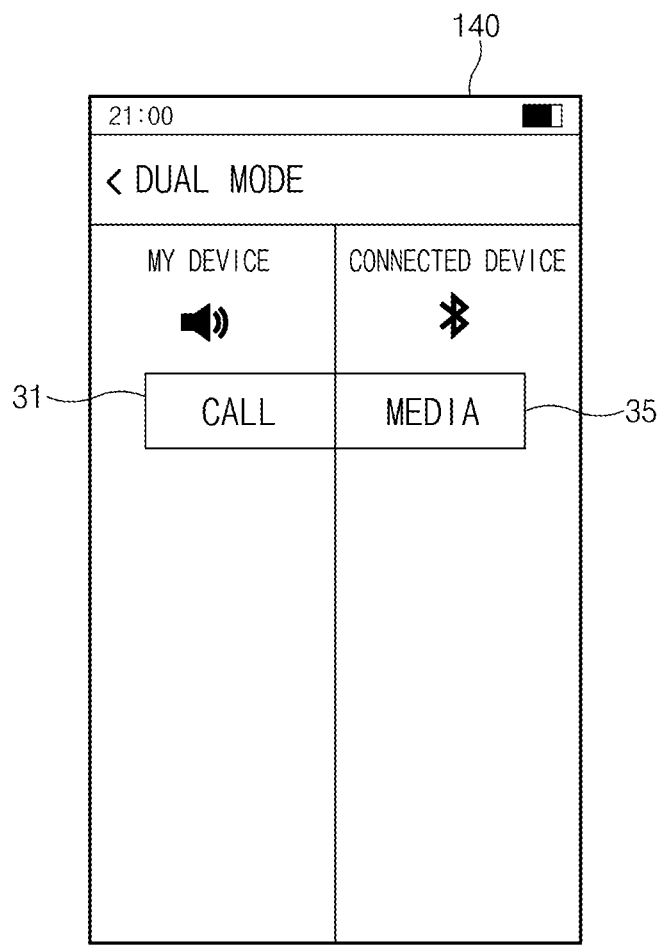
Figure 3C:
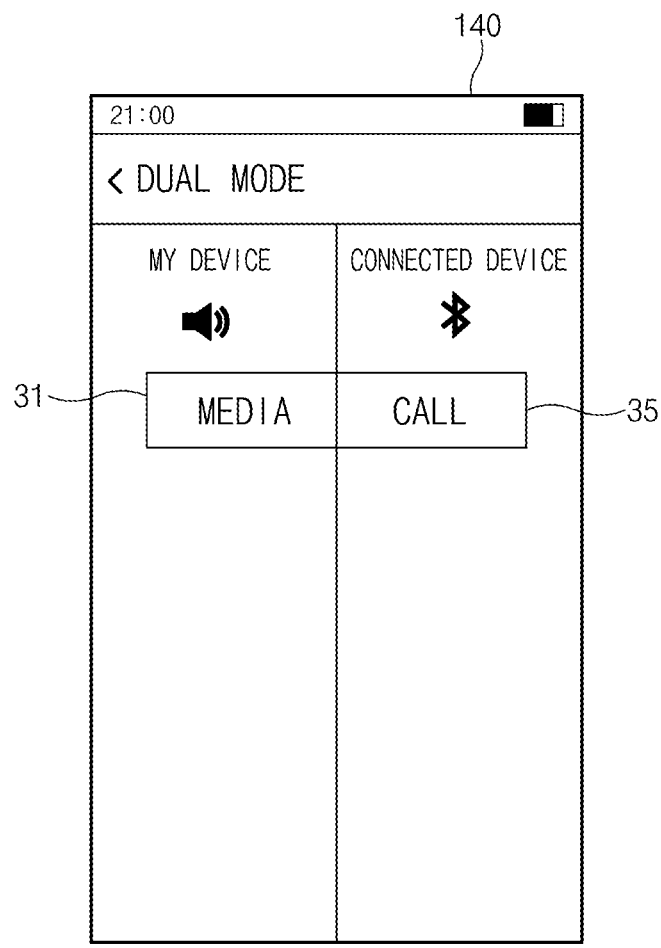

FIGS. 3A, 3B and 3C are diagrams illustrating an example user interface, according to various example embodiments of the present disclosure.

Referring to FIG. 3A, the processor 160 may display a user interface for setting an audio output mode (or a Bluetooth mode), on the display 140. For example, if a Bluetooth setting menu is selected by a user, the processor 160 may display the user interface illustrated in FIG. 3A.

Referring to FIG. 3A, the user interface may include an icon 21 for activating or deactivating a Bluetooth. A user may activate or deactivate the Bluetooth using the icon 21. According to an embodiment, if the Bluetooth is configured to be deactivated (e.g., if the icon 21 is set to 'OFF'), the processor 160 may set the audio output mode (or a Bluetooth mode) as a first mode. According to an embodiment, if the Bluetooth is configured such that the Bluetooth is activated (e.g., if the icon 21 is set to 'ON'), the processor 160 may set the audio output mode as a second mode.

Referring to FIG. 3A, the user interface may include an icon 23 for setting a dual mode. A user may set the dual mode by using, for example, the icon 23. According to an embodiment, the icon 23 for setting the dual mode may be activated while only the Bluetooth is activated (e.g., while the icon 21 is set to 'ON'). According to an embodiment, if the dual mode is activated (e.g., if the icon 23 is set to 'ON'), the processor 160 may set the audio output mode as a third mode.

Referring to FIG. 3A, the user interface may include an icon 25 for setting the transmission path of audio data in a dual mode. If the icon 25 is selected by a user, the processor 160 may display the user interface illustrated in FIG. 3B on the display 140.

Referring to FIG. 3B, the user interface may include a first object 31 indicating audio data (or audio data sent to the audio module 120) to be output from the electronic device 100 and a second object 35 indicating audio data (or audio data sent to the Bluetooth module 111) to be output from an external device. According to an embodiment, the first object 31 and the second object 35 may include a text (or an icon) indicating the kind of audio data to be output from each device. For example, in the case where the electronic device 100 is configured such that call data is sent to the audio module 120 and media data is sent to the Bluetooth module 111, 'call' may be displayed on the first object 31 and 'media' may be displayed on the second object 35. A user may set, for example, the transmission path of audio data by using the first object 31 or the second object 35. According to an embodiment, the processor 160 may set (or change) the transmission path of audio data based on a user input.

According to an embodiment, if the transmission path of audio data is changed, the processor 160 may change and display a text (or an icon) included in the first object 31 and the second object 35 such that the changed text corresponds to the changed path. For example, referring to FIG. 3C, in the case where the electronic device 100 is configured such that the media data is sent to the audio module 120 and the call data is sent to the Bluetooth module 111, 'media' may be displayed on the first object 31 and 'call' may be displayed on the second object 35.

According to an embodiment, the processor 160 may set an audio output mode based on a control command that is received from an external device through the Bluetooth module 111. For example, a user input for changing the audio output mode of the electronic device 100 may be received from an external device with an external device connected with the Bluetooth module 111. The processor 160 may switch the audio output mode from a second mode to the third mode or from the third mode to the second mode based on a control command that is received from an external device through the Bluetooth module 111.

According to an embodiment, if the audio output mode is set as the third mode, the processor 160 may activate the audio module 120 and the Bluetooth module 111 at the same time. According to an embodiment, the processor 160 may determine the kind of audio data if the playback (or the output) of audio data is requested while the audio output mode is set as the third mode and the Bluetooth module is connected with an external device. For example, the processor 160 may determine whether the audio data of which the playback is requested is call data or media data. For example, if the playback (or the output) of audio data stored in the memory 150 is requested, the processor 160 may determine that the audio data is media data. For example, the processor 160 may verify the communication protocol of the received audio data if the playback of audio data that is received through the communication module 110 (e.g., a cellular module or a Wi-Fi module) is requested and may determine that the audio data is call data if the audio data is received according to a protocol used to make a voice call or a video call.

According to an embodiment, the processor 160 may send the audio data through a first path if the audio data is call data, and the processor 160 may send the audio data through a second path, which is different from the first path, if the audio data is media data. For example, the first path may be a path connected with the Bluetooth module 111, and the second path may be a path connected with the audio module 120. As another example, the first path may be a path connected with the audio module 120, and the second path may be a path connected with the Bluetooth module 111.

According to an embodiment, the transmission path of audio data may be set based on a user input. For example, as described with reference to FIGS. 3A to 3C, the processor 160 may set the transmission path of audio data based on the user input.

According to an embodiment, the transmission path of audio data may be set based on the Bluetooth profile for the Bluetooth module 111 and an external device. For example, the processor 160 may verify the Bluetooth profile used to connect an external device with the Bluetooth module 111 and may set a path for sending audio data based on whether the verified Bluetooth profile supports a stereo audio. For example, if the Bluetooth profile supports the stereo audio, the processor 160 may set the first path as a path connected with the audio module 120 and may set the second path as a path connected with the Bluetooth module 111. For example, if the Bluetooth profile does not support the stereo audio, the processor 160 may set the first path as a path connected with the Bluetooth module 111 and may set the second path as a path connected with the audio module 120.

According to an embodiment, if call data is sent to the audio module 120, the processor 160 may allow the call data to be output through the speaker 121 or the receiver 123 connected with the audio module 120. According to an embodiment, if media data is sent to the audio module 120, the processor 160 may allow the media data to be output through the speaker 121 connected with the audio module 120.

According to an embodiment, if audio data (e.g., call data or media data) is sent to the Bluetooth module 111, the processor 160 may send the audio data to an external device through the Bluetooth module 111. The audio data sent to the external device may be output by the external device.

According to an embodiment, if the first path is set as a path connected with the Bluetooth module 111 and the second path is set as a path connected with the audio module 120, the processor 160 may deactivate the receiver 123 and the microphone 125. For example, the processor 160 may block a path through which the receiver 123 and the microphone 125 are connected with the audio module 120.

According to an embodiment, even though a call is received or made with the Bluetooth module 111 connected with an external device when media is played, the processor 160 may successively play the media, not interrupting the media that is played.

Figure 4:
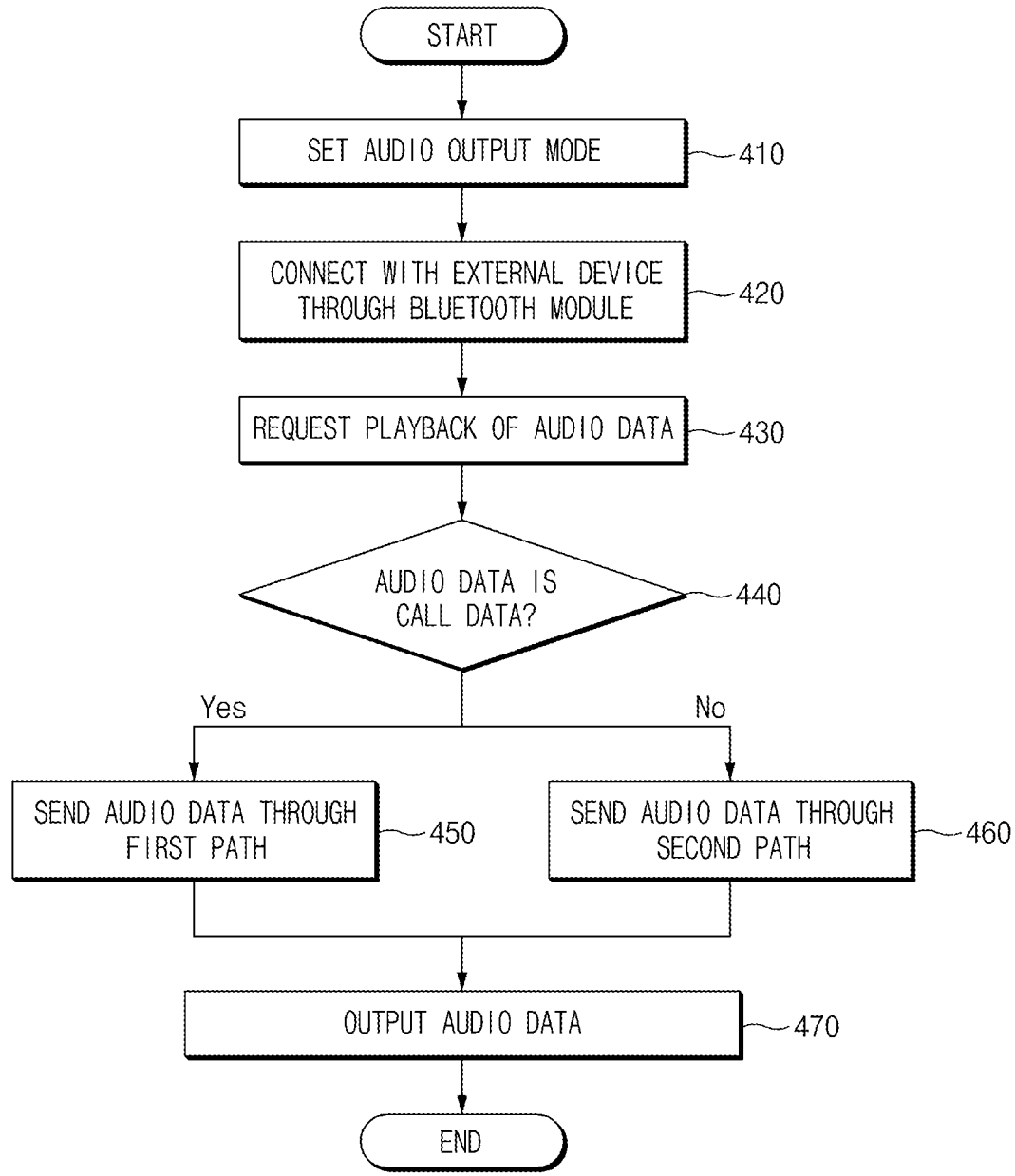
FIG. 4 is a flowchart illustrating an example audio outputting method of an electronic device, according to various example embodiments.

FIG. 4 is a flowchart illustrating an example audio outputting method of an electronic device, according to various example embodiments.

The flowchart illustrated in FIG. 4 may include operations which the electronic device 100 illustrated in FIG. 1 processes. Even though omitted below, details about the electronic device 100 described with reference to FIGS. 1, 2A to 2D, and 3A to 3C may be applied to the flowchart illustrated in FIG. 4.

Referring to FIG. 4, in operation 410, the electronic device 100 may set an audio output mode. According to an embodiment, the electronic device 100 may set the audio output mode based on a user input. According to an embodiment, the audio output mode of the electronic device 100 may include a first mode in which the audio module 120 is activated, a second mode in which the Bluetooth module 111 is activated, and a third mode in which the audio module 120 and the Bluetooth module 111 are activated at the same time. According to an embodiment, the electronic device 100 may set the audio output mode as one of the first to third modes based on the user input. According to an embodiment, the electronic device 100 may set the audio output mode based on a control command that is received from an external device through the Bluetooth module 111.

The audio outputting method according to various embodiments of the present disclosure may be performed while the audio output mode is set as the third mode. Hereinafter, it will be described under assumption that the electronic device 100 sets the audio output mode as the third mode in operation 410.

According to an embodiment, in operation 420, the electronic device 100 may be connected with an external device through the Bluetooth module 111. For example, if the audio output mode is set as the third mode, the electronic device 100 may activate the Bluetooth module 111 and may perform a Bluetooth pairing procedure with the external device.

According to an embodiment, before the audio output mode is set as the third mode, the electronic device 100 may be previously connected with an external device. For example, after the electronic device 100 is connected with the external device while the audio output mode is the second mode, the audio output mode may be set as the third mode.

According to an embodiment, in operation 430, the electronic device 100 may be requested to play audio data. For example, a command for playing music or a video may be input by a user or an event that a call starts may occur.

According to an embodiment, in operation 440, the electronic device 100 may determine whether the audio data that the electronic device 100 is requested to play is call data. According to an embodiment, if the playback of the audio data is requested, the electronic device 100 may determine the kind of audio data. For example, the electronic device 100 may determine whether the audio data of which the playback is requested is call data or media data.

According to an embodiment, if the audio data is call data, in operation 450, the electronic device 100 may send the audio data through a first path. According to an embodiment, if the audio data is not call data (or is media data), in operation 460, the electronic device 100 may send the audio data through a second path.

According to an embodiment, the first path may be a path connected with the Bluetooth module 111, and the second path may be a path connected with the audio module 120. According to an embodiment, the first path may be a path connected with the audio module 120, and the second path may be a path connected with the Bluetooth module 111.

According to an embodiment, the transmission path of audio data may be set based on a user input. According to an embodiment, the processor 160 may be configured based on the Bluetooth profile for the Bluetooth module 111 and an external device.

According to an embodiment, in operation 470, the electronic device 100 may output the audio data. According to an embodiment, if call data is sent to the audio module 120, the electronic device 100 may allow the call data to be output through the speaker 121 or the receiver 123 connected with the audio module 120. According to an embodiment, if media data is sent to the audio module 120, the electronic device 100 may allow the media data to be output through the speaker 121 connected with the audio module 120. According to an embodiment, if audio data (e.g., call data or media data) is sent to the Bluetooth module 111, the electronic device 100 may send the audio data to an external device through the Bluetooth module 111.

According to various example embodiments of the present disclosure, different kinds of audio data may be simultaneously output through an electronic device and a Bluetooth device using a new Bluetooth connection mode, thereby making it possible to increase the convenience of a user, for example, preventing the playback of existing audio data from interruption due on reception of a call.

What is claimed is:

1. An electronic device comprising:
   an audio module including audio circuitry;
   a BLUETOOTH module including BLUETOOTH circuitry;
   a touch screen; and
   a processor configured to:
      display, on the touch screen, an object for selecting an audio output mode from among a first mode in which the audio circuitry is activated, a second mode in which the BLUETOOTH circuitry is activated, and a third mode in which the audio circuitry and the BLUETOOTH circuitry are both activated at the same time, the object including a first icon that indicates the first mode, a second icon that indicates the second mode, and a third icon that indicates the third mode,
      set the audio output mode to the first mode by changing the third icon to the first icon based on a first user input received through the object,
      set the audio output mode to the second mode by changing the first icon to the second icon based on a second user input received through the object, and
      set the audio output mode to the third mode by changing the second icon to the third icon based on a third user input received through the object,
   wherein if an audio output mode is the third mode and if playback of audio data is requested while BLUETOOTH module is connected with an external device, the processor is configured to:
      determine whether the audio data is call data or media data;
      send the audio data through a first path if the audio data is call data; and
      send the audio data through a second path if the audio data is media data.

2. The electronic device of claim 1, wherein the first path is a path connected with the BLUETOOTH circuitry of the BLUETOOTH module, and
   wherein the second path is a path connected with the audio circuitry of the audio module.

3. The electronic device of claim 2, further comprising:
   a speaker connected with the audio circuitry of the audio module,
   wherein the processor is configured to:
   send the audio data, which is sent through the first path, to the external device through the BLUETOOTH module; and
   output the audio data, which is sent through the second path, through a speaker.

4. The electronic device of claim 1, wherein the first path is a path connected with the audio circuitry of the audio module, and
   wherein the second path is a path connected with the BLUETOOTH circuitry of the BLUETOOTH module.

5. The electronic device of claim 4, further comprising:
   a speaker connected with the audio module; and
   a receiver connected with the audio module,
   wherein the processor is configured to:
   output audio data, which is sent through the first path, through the speaker or the receiver; and
   send audio data, which is sent through the second path, to the external device through the BLUETOOTH module.

6. The electronic device of claim 1, wherein the processor is configured to set the audio output mode to one of the first mode, the second mode and the third mode, based on a control command received from the external device through the BLUETOOTH module.

7. The electronic device of claim 1, wherein the processor is configured to set a transmission path of the audio data based on a second user input received through the touch screen.

8. The electronic device of claim 1, wherein the processor is configured to verify a BLUETOOTH profile used to connect the external device with the BLUETOOTH module and to set a path for sending the audio data based on whether the BLUETOOTH profile supports stereo audio.

9. The electronic device of claim 8, wherein the processor is configured to set the path such that the call data is sent to the audio module and the media data is sent to the BLUETOOTH module, if the BLUETOOTH profile supports stereo audio; and
   wherein the processor is configured to set the path such that the call data is sent to the BLUETOOTH module and the media data is sent to the audio module, if the BLUETOOTH profile does not support stereo audio.

10. A method of outputting audio in an electronic device, the method comprising:
    displaying, on a touch screen, an object for selecting an audio output mode from among a first mode in which audio circuitry is activated, a second mode in which BLUETOOTH circuitry is activated, and a third mode in which the audio circuitry and the BLUETOOTH circuitry are activated at the same time, the object including a first icon that indicates the first mode, a second icon that indicates the second mode, and a third icon that indicates the third mode,
    setting an audio output mode to the first mode by changing the third icon to the first icon based on a first user input received through the object;
    setting the audio output mode to the second mode by changing the first icon to the second icon based on a second user input received through the object;
    setting the audio output mode to the third mode by changing the second icon to the third icon based on a third user input received through the object;
    connecting the electronic device with an external device through a BLUETOOTH module;
    determining whether audio data is call data or media data, if playback of the audio data is requested;
    sending the audio data through a first path if the audio data is call data; and
    sending the audio data through a second path if the audio data is media data.

11. The method of claim 10, wherein the first path is a path connected with the BLUETOOTH module, and
    wherein the second path is a path connected with the audio module.

12. The method of claim 11, further comprising:
    sending the audio data, which is sent through the first path, to the external device through the BLUETOOTH module; and
    sending the audio data, which is sent through the second path, through a speaker connected with the audio module.

13. The method of claim 10, wherein the first path is a path connected with the audio module, and
    wherein the second path is a path connected with the BLUETOOTH module.

14. The method of claim 13, further comprising:
outputting the audio data, which is sent through the first path, through a speaker or a receiver connected with the audio module; and
sending the audio data, which is sent through the second path, to the external device through the BLUETOOTH module.

15. The method of claim 10, wherein the setting of the audio output mode comprises:
receiving a control command from the external device through the BLUETOOTH module; and
setting the audio output mode to the third mode, based on the control command.

16. The method of claim 10, further comprising:
setting a transmission path of the audio data based on a second user input received through the touch screen.

17. The method of claim 10, further comprising:
determining whether a BLUETOOTH profile used to connect the external device with the BLUETOOTH module supports stereo audio; and
setting a path for sending the audio data based on whether the BLUETOOTH profile supports stereo audio.

18. The method of claim 17, wherein the setting of the path of the audio data comprises:
setting the path such that the call data is sent to the audio module and the media data is sent to the BLUETOOTH module, if the BLUETOOTH profile supports stereo audio; and
setting the path such that the call data is sent to the BLUETOOTH module and the media data is sent to the audio module, if the BLUETOOTH profile does not support stereo audio.

* * * * *